(12) United States Patent
Mou (10) Patent No.: US 6,199,993 B1
(45) Date of Patent: Mar. 13, 2001

(54) STRUCTURE OF AUTOMOBILE EXTERIOR REARVIEW MIRROR

(76) Inventor: Lin Chung Mou, 4th Fl., No. 524, Chiang Rd., Taipei (TW)

( * ) Notice: Subject to any disclaimer, the term of this patent is extended or adjusted under 35 U.S.C. 154(b) by 1192 days.

(21) Appl. No.: 08/510,921

(22) Filed: Aug. 3, 1995

Related U.S. Application Data (63) Continuation of application No. 08/248,915, filed on May 25, 1994, now abandoned.

(51) Int. Cl.$^7$ ............................... G02B 5/10; B60R 1/08
(52) U.S. Cl. ......................... 359/864; 359/850; 359/838
(58) Field of Search ........................... 359/838, 844, 359/850, 864, 866, 868, 871

(56) References Cited

U.S. PATENT DOCUMENTS

| | | | |
|---|---|---|---|
| 1,771,061 | * 7/1930 | Rice | 359/844 |
| 3,104,274 | * 9/1963 | King | 359/864 |
| 3,267,806 | * 8/1966 | Azegami | 359/864 |
| 3,338,655 | * 8/1967 | Young | 359/864 |
| 3,389,952 | * 6/1968 | Tobin, Jr. | 359/864 |
| 4,325,609 | * 4/1982 | Alford | 359/864 |
| 5,005,962 | * 4/1991 | Edelman | 359/864 |

FOREIGN PATENT DOCUMENTS

| | | | |
|---|---|---|---|
| 1017082 | * 1/1966 | (GB) | 359/864 |
| 2048189 | * 12/1980 | (GB) | 359/868 |
| 7908257 | * 6/1981 | (NL) | 359/864 |

\* cited by examiner

*Primary Examiner*—Ricky D. Shafer
(74) *Attorney, Agent, or Firm*—Donald C. Casey, Esq.

(57) ABSTRACT

A new structure of automobile exterior rearview mirror which integrates an arc-surface wide-angle mirror and a plane mirror together to form a one-piece design. This design overcomes the drawbacks of the existing exterior rearview mirror, in which a driver use a stick-on type wide-angle mirror. In addition, the present invention also provides a blank surface area with parabolized image coating. The blank surface area is formed between the wide-angle mirror and the plane mirror and its function is to prevent the refraction and reflection interferences caused by the wide-angle mirror and the plane mirror. The exterior rearview mirror of the present invention is economical, will not fall off and has no blind spot. It is a full view safety mirror for backing up the car, making turns and changing lanes in the roadway.

3 Claims, 8 Drawing Sheets

STRUCTURE OF AUTOMOBILE EXTERIOR REARVIEW MIRROR

This application is a continuation of application Ser. No. 08/248,915 filed May 25, 1994 now abandoned.

BACKGROUND OF THE INVENTION (a) Field of the Invention

The present invention relates to a new structure of an automobile exterior rearview mirror, more specifically, to the exterior rearview mirror having an arc-surface wide-angle mirror and a plane mirror integrated together to provide a fullview mirror that reduces blind spots and interferences.

(b) Description of the Prior Art

Figure 1:
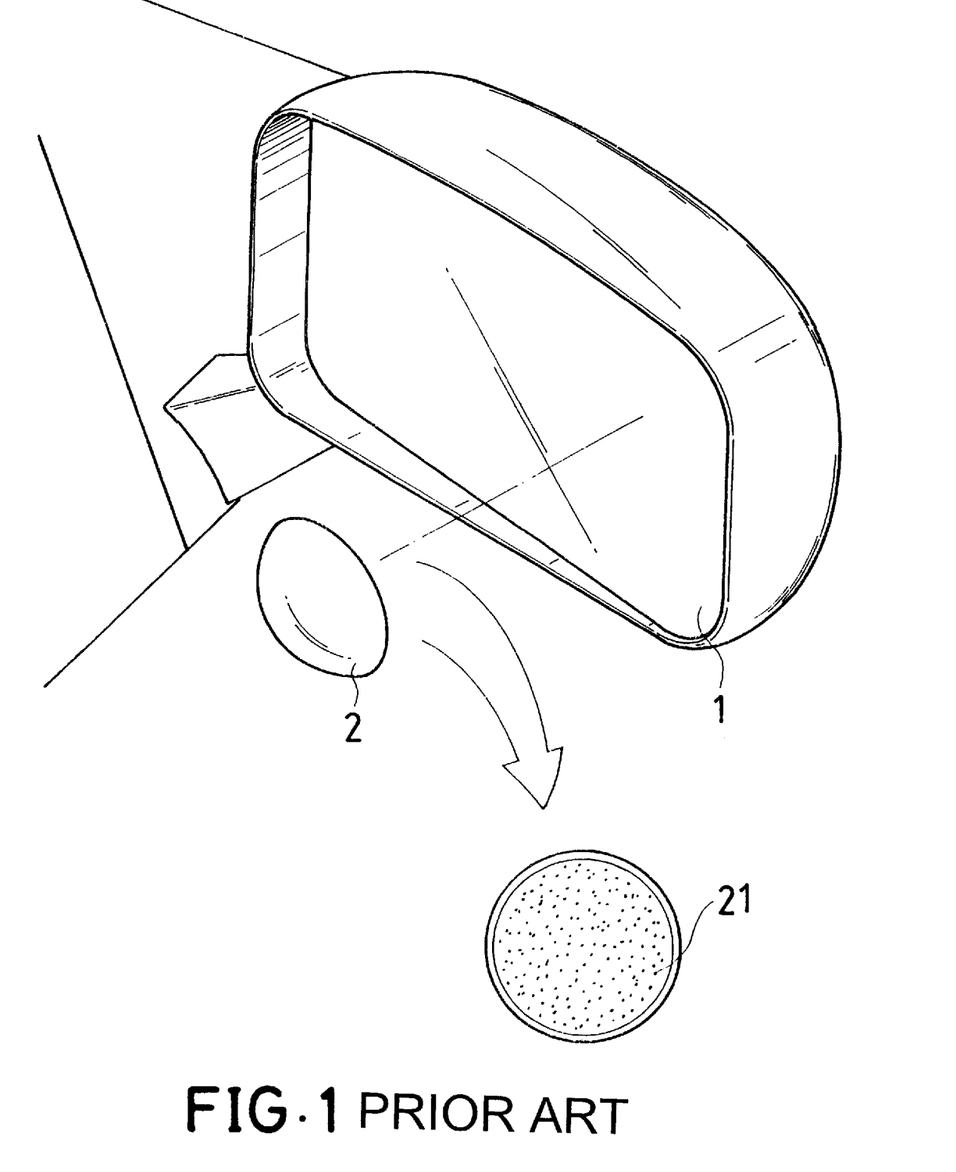
FIG. 1 is a diagrammatic view showing the conventional exterior rearview mirror with the stick-on type wide-angle mirror used in automobiles.

With reference to FIG. 1, when driving on a curved roadway or in an alley, a driver often encounters conditions wherein he cannot fully visualize the rearview from the exterior rearview mirror (1). In such cases the driver has to use the arc-surface mirror provided on the side of the roadway or someone has to direct the driver to go through. It is apparent that the design of the existing exterior rearview mirror for automobiles has blind spots. Because of this a stick-on type arc-surface wide-angle mirror (2) is available for the driver to adhere it to the plane exterior rearview mirror (1) in the automobile, as shown in FIG. 1. The attachment of the arc-surface mirror (2) to the exterior rearview mirror in the automobile makes use of a double-sided tape (21). This type of attachment is not secure and moisture and vibration can cause the arc-surface mirror (2) to fall off. In addition, it is not easy to position the wide-angle mirror (2). A helper is needed for the car owner to properly position the stick-on arc-surface mirror (2). Any displacement of the stick-on arc-surface mirror will only give a partial rearview to the driver.

Even though the arc-surface wide-angle mirror (2) can be attached in the right position, the image from the plane rearview mirror can be interfered by the attached arc-surface mirror (2). This can cause some trouble in driving, such as the rearview interferences in backing up the car, changing lanes or making turns. All these factors create some safety concern for the driver.

Therefore, it is an object of the present invention to provide a new structure for the automobile exterior rearview mirror to overcome the disadvantages of the stick-on type arc-surface mirror so that a full rearview of the road condition can be seen from the driver's seat.

SUMMARY OF THE INVENTION

The main object according to the present invention is to provide a new structure of an automobile exterior rearview mirror in which the arc-surface wide-angle mirror and the plane rearview mirror are integrally fabricated together so that a driver does not have to use the stick-on type and he does not have to worry about the accurate positioning of the stick-on.

Another object according to the present invention is to provide a new structure of an automobile exterior rearview mirror in which a circular surface of blank zone is parabolized with a coating during the stage of grinding, so that the interferences caused by the arc-surface wide-angle mirror and the plane mirror can be eliminated.

A further object according to the present invention is to provide a series of different models of the said automobile exterior rearview mirror for different applications.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 2A:
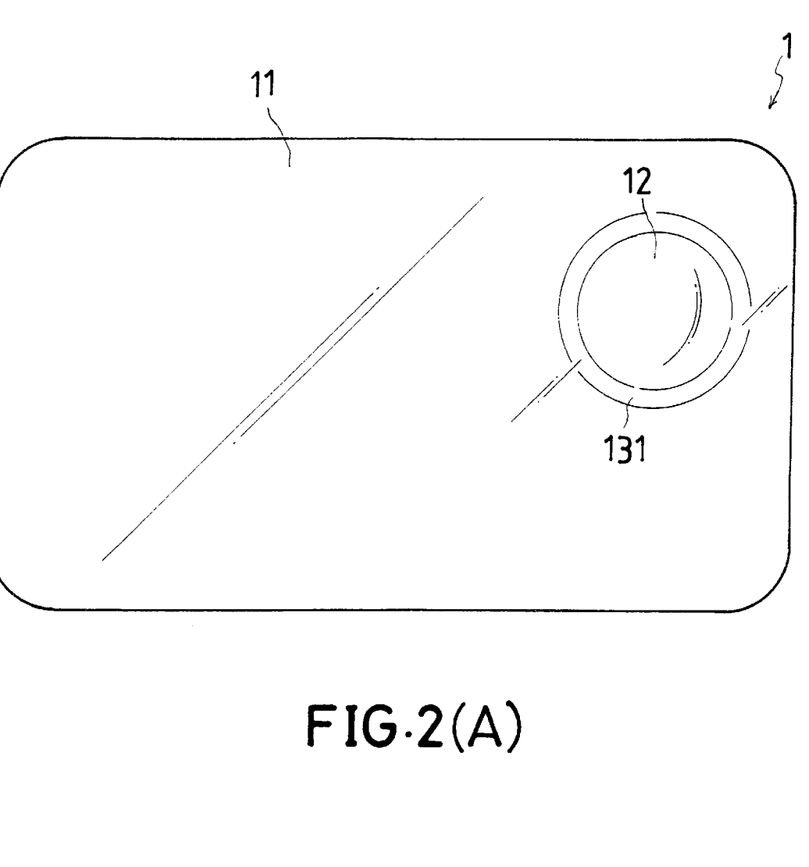
FIG. 2A is a plane view showing a new structure of the automobile exterior rearview mirror according to the present invention.
Figure 2B:
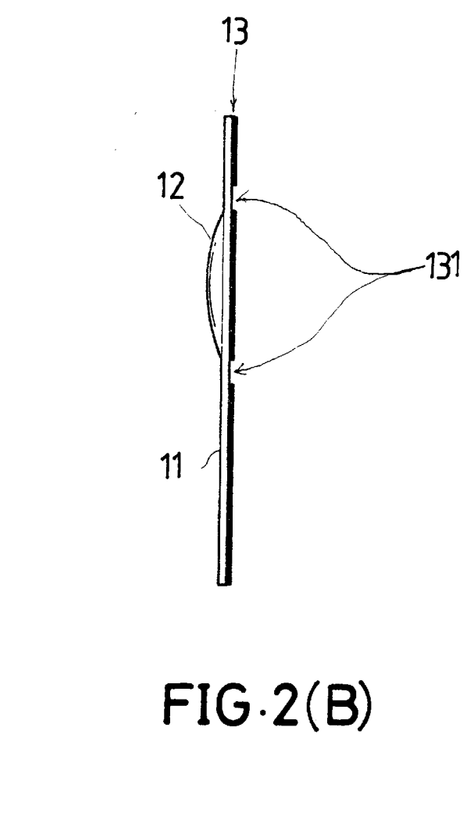
FIG. 2B is a side view of the plane view in FIG. 2A.

The new structure of the automobile exterior rearview mirror is a device that combines the functions of a plane mirror and a wide-angle mirror. The new structure mainly consists of a plane mirror zone (11), an arc-surface wide-angle zone (12), as are shown in FIGS. 2A and 2B. In between the plane mirror zone (11) and the arc-surface wide-angle zone (12) is a circular blank surface (131) with an image coating (13) by parabolizing or grinding.

Figure 3:
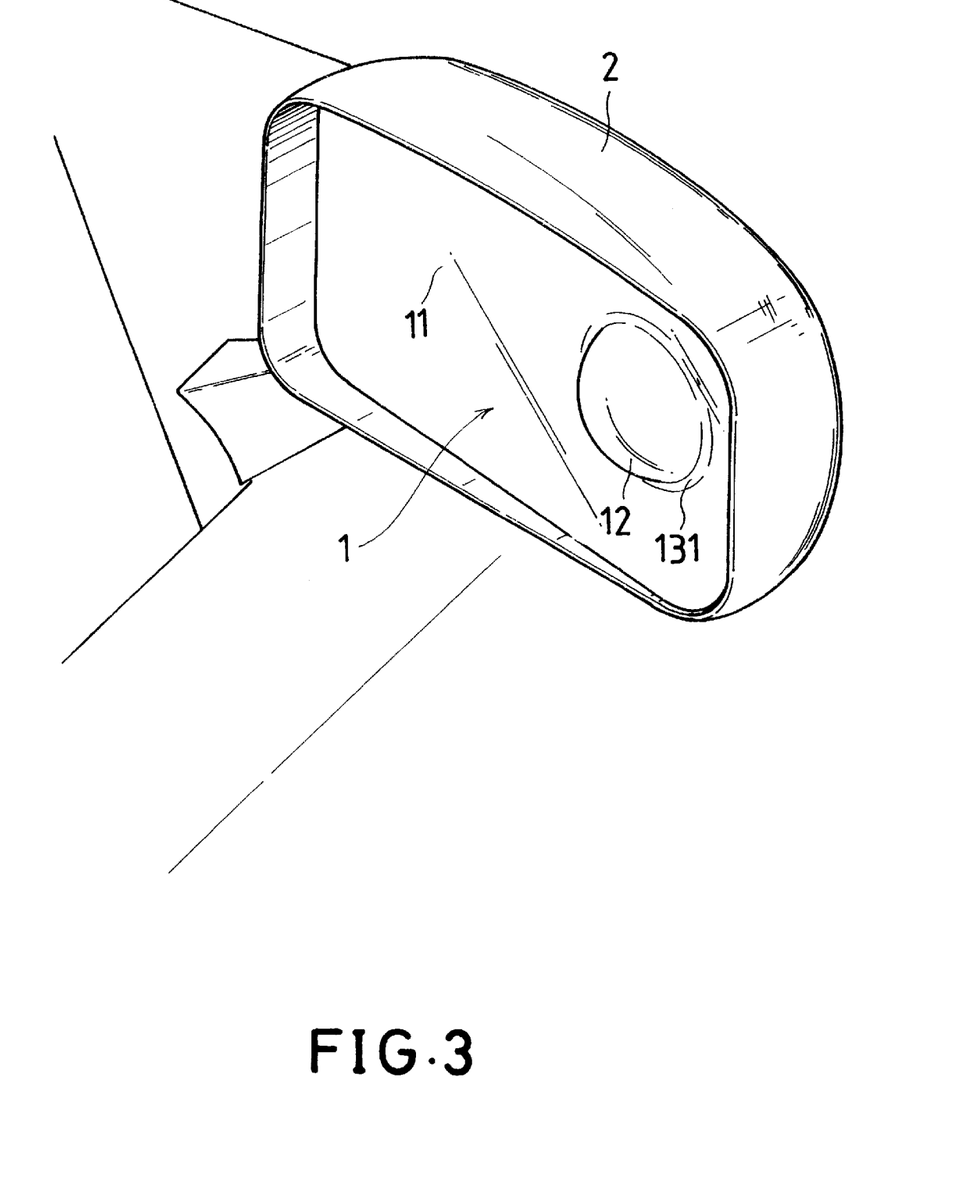
FIG. 3 shows the assembly of the exterior rearview mirror framed inside a frame.

Referring to FIG. 3 for an embodiment of the new structure of the automobile exterior rearview mirror (1) as it is framed by a frame (2). The unique design of the exterior rearview mirror has the following features:

The wide-angle zone (12) and the plane mirror zone (11) are fabricated into an integral device, therefore, there is no need to concern about the falling off and the accurate positioning of the stick-on. In addition, since the device is fabricated professionally, a series of versatile, good quality and well designed products can be provided to allow a driver to replace the mirror. Moreover, the device is available at a reasonable price.

The color of the parabolized image coating and the size of the exterior rearview mirror (1) can be adjusted accordingly based on the districts (country or area), the weather and the requirement of the consumers. This makes it more practical to be used by the car driver anywhere in the world.

The circular blank surface (131) with the parabolized image coating (13) is provided to prevent the refraction and reflection interferences caused by the arc-surface wide-angle zone (12) and the plane zone (11). With the circular blank surface (131) the interferences from the two mirrors can be prevented so that the driver can have a complete control of his driving based on the visibility from the plane mirror zone (11) and the wide-angle mirror zone (12) (there will be no blind spot). Thus the chances of having accidents from backing up the car and making a turn can be avoided.

Figure 4A:
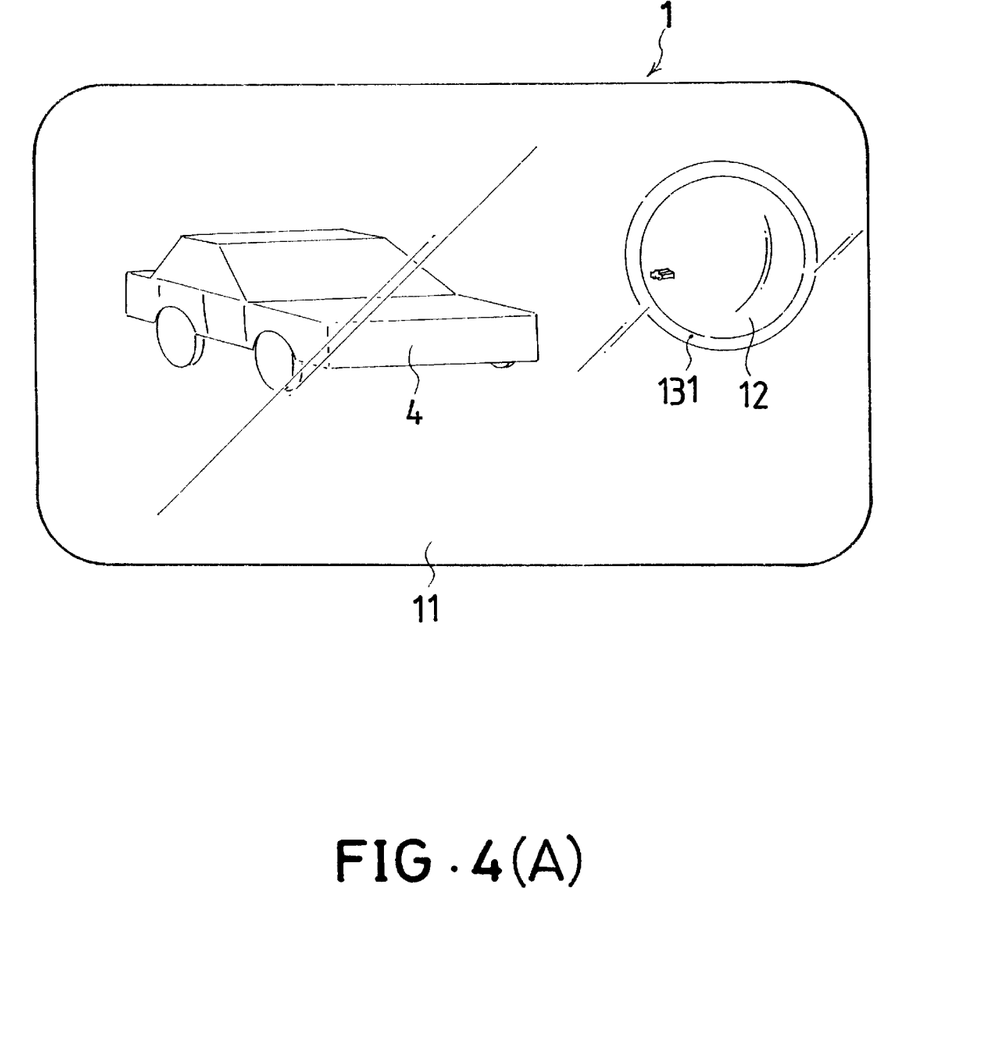
FIG. 4A is an illustrative view showing the assembly in FIG. 3 installed in automobile on the road.
Figure 4B:
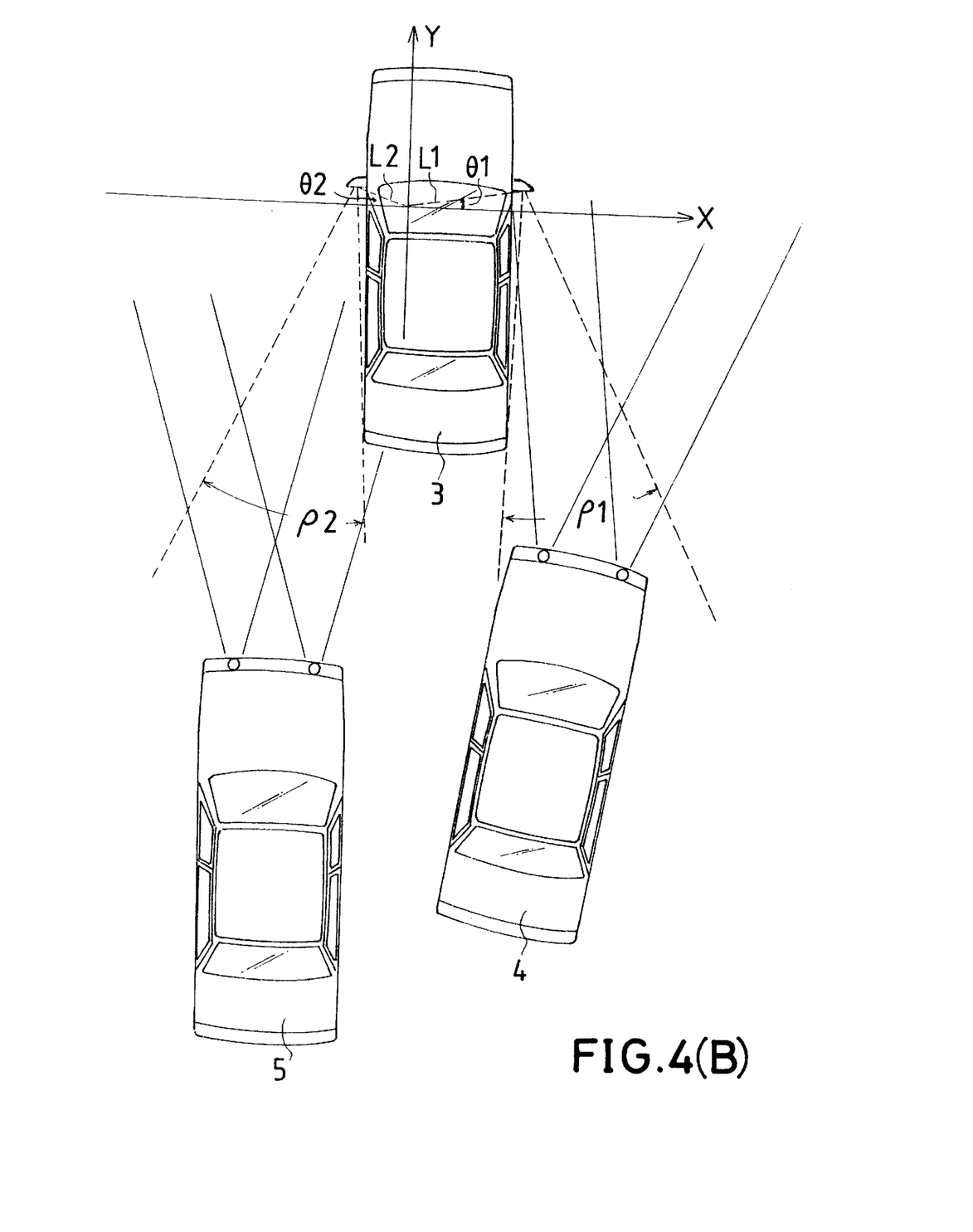
FIG. 4B is a diagrammatic view showing the relationship of the driver's view and the image from the exterior rearview mirror.

Please refer to FIGS. 4A and 4B. As shown in FIG. 4B, let's assume that car (3) is the car at the front with the exterior rearview mirror (1) installed, and cars (4) and (5) are approaching from the back of car (3), then the view of the driver and the exterior rearview mirror (1) are connected by lines (L1) and (L2). The visibility from the exterior rearview mirror (1), (i.e. the horizontal axis X and the vicinity of the wide-angle mirror (12)). Let's further assume that the angles θ1 and θ2 can be ignored, and the image zone formed by cars (4) and (5) with the wide-angle zone (12) is expressed by the dotted lines ρ1 and σ2, then the circular blank surface (131) with the parabolized coating (13) can prevent the interference of images overlapping and blocking from the plane zone (11) and the wide-angle zone (12). The visual disturbance from natural light source, reflection from the roadway and the light sources from the cars in the back can all be eliminated. Please refer to FIG. 4A.

The above circular blank surface (131) is formed based on the refraction, reflection and the blocking area of the wide-angle zone (12) and the plane zone (11). (The area of the circular blank surface can be calculated based on the refraction and reflection principles in optical physics, it is a complicated issue and therefore is not listed here). The exterior rearview mirror (1) formed with the circular blank surface area (131) will show a clear and correct positioning of the image, and the visibility will not be disturbed and blocked.

Figure 5A:
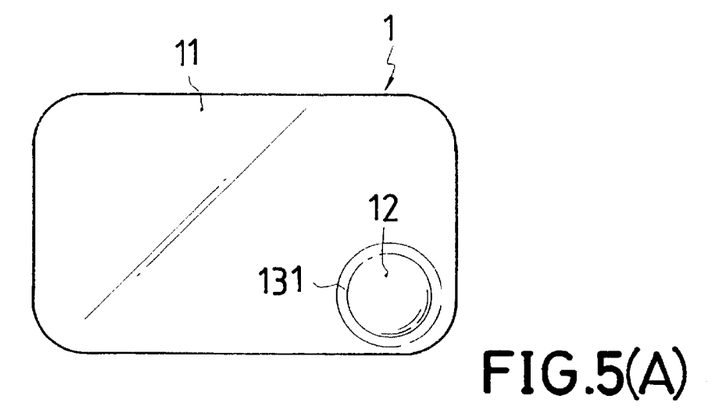
FIGS. 5A, 5B and 5C are respectively the plane views showing the different locations of the wide-angle mirror in the exterior rearview mirror according to the present invention.
Figure 5B:
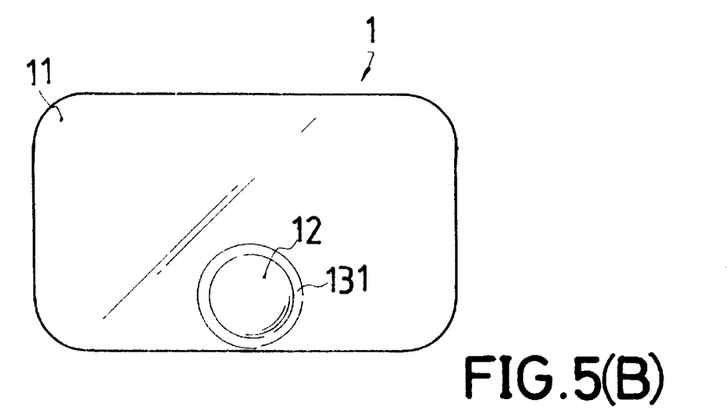
Figure 5C:
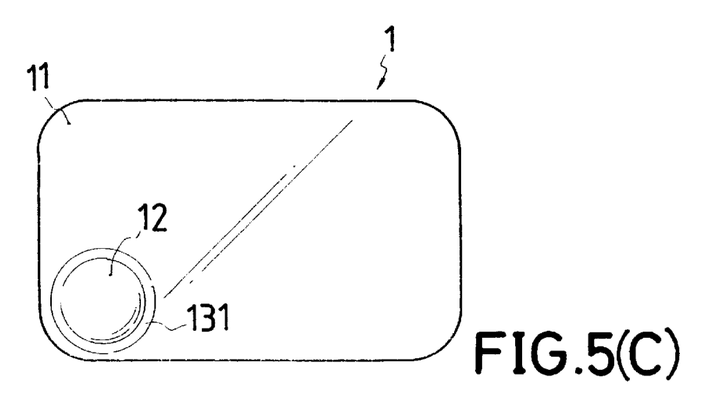

In addition, a series of different models can be fabricated based on the above configuration of the automobile exterior rearview mirror, some of these models include the placement of the wide-angle zone (12) to be in a different location. Please refer to FIGS. 5A, 5B and 5C, it can be seen that there are three kinds of exterior rearview mirror (1) that are practical to be used. The difference between the three exterior rearview mirrors are on the locations of the wide-angle zone (12). As shown in FIG. 5A, the arc-surface wide-angle mirror zone (12) is located on the right hand lower corner in the plane mirror zone (11), the wide-angle mirror (12) is located in the lower center portion of the plane mirror (11) in FIG. 5B, and the wide-angle mirror (12) is located in the left hand lower corner of the plane mirror (11) in FIG. 5C. Based on the principle of symmetry, six different models of exterior rearview mirror (1) will be available for use in different countries and different models of cars. A driver can have his own choice of selecting the right exterior rearview mirror based on his height, his driving style and habit, therefore maximizing the application and function of the arc-surface wide-angle mirror (12).

Figure 6:
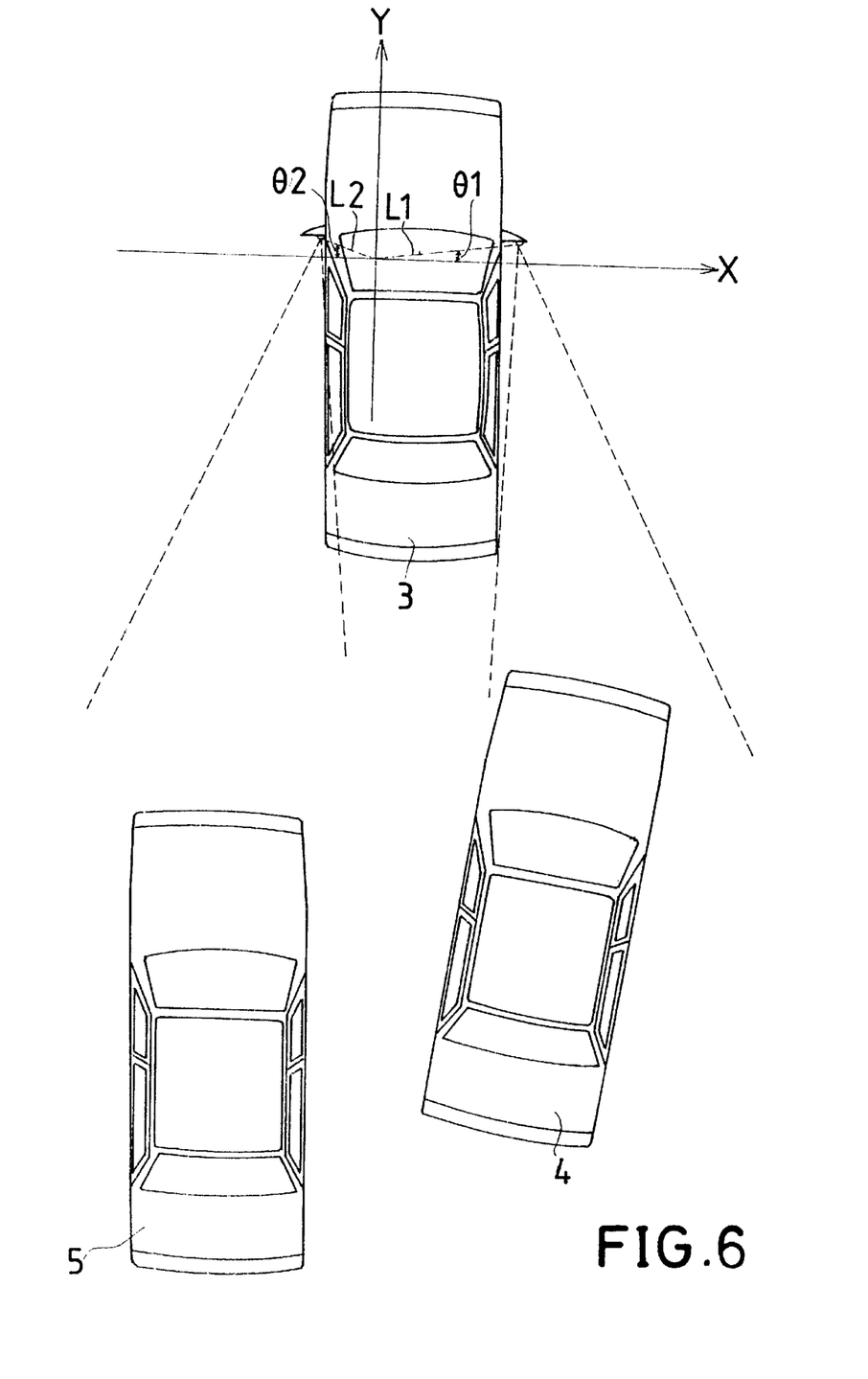
FIG. 6 is an illustrative view showing the relationship of the driver's view and the image from the exterior rearview mirror. (The driver's seat is located on the left hand side of the car).

As shown in FIG. 6, the driver seat is located on the left hand side of the car. Since the driver is far away from the right-side mirror, he can choose the new device of the present invention with the wide-angle mirror located in the lower right hand corner, as shown in FIG. 5A. This selection allows the driver to have a full view on the right hand side of the car, so that he can change lane easily and have better visibility on the right side of his car. The full view from the exterior rearview mirror (1) prevents any blind spot which can cause automobile accident. The related principle can be seen from FIGS. 4A and 4B. Similarly, the exterior rearview mirror (1) on the left hand side can also be selected so as to assure the safety when the car is about to take off. This is because a proper image can be displayed on the plane zone (11), and the lower image on the wide-angle zone provides the view below the body of the car and the condition at the front of the rear wheel.

Figure 7:
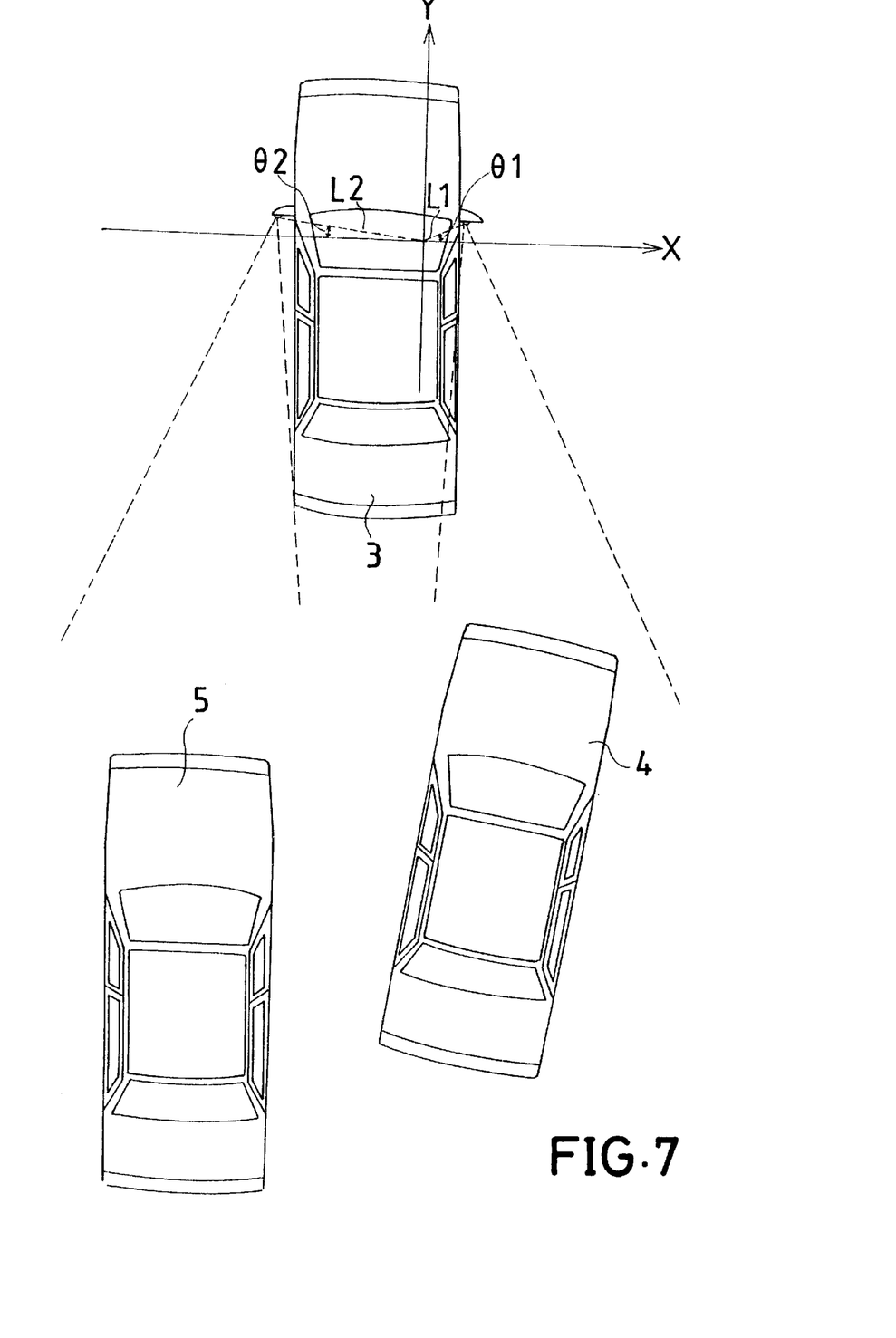
FIG. 7 is an illustrative view showing the relationship of the driver's view and the image from the exterior rearview mirror. (The driver's seat is located on the right hand side of the car)

Similarly, if the driver seat is located on the right hand side of the car, then the exterior rearview mirror (1) on the right hand side of the car shall be selected such that the arc-surface wide-angle zone (12) is located on the lower left hand corner of the plane mirror zone (11). Thus the driver can have a view below the body of the car. On the other hand, the left side exterior rearview mirror (1) shall be chosen to be the same type of exterior rearview mirror, so that the wide-angle zone (12) can provide a safe and wider visibility area for lane changing, backing up and making turns. Please refer to the related drawings for the above description as shown in FIG. 7. In addition, the above selection of the exterior rearview mirror shall be changed, if necessary, to meet the practical needs. This includes the use of the wide-angle mirror zone (12) located in the lower center of the exterior rearview mirror so that the road condition behind the rear wheel can be seen.

In summary, it is believed that the present invention would improve the drawbacks of the conventional product and it would also enhance the safety in driving. Therefore, a claim is made in compliance with the law.

Although the invention has been described in its preferred form with a certain degree of particularity it is understood that the present disclosure of the preferred form has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exists in the invention disclosed.

What is claimed is:

1. An automobile exterior rearview mirror comprising:
   a plane mirror zone;
   an integral circular, convex or concave, wide-angle mirror zone disposed at a predetermined position within said plane mirror zone,
   a circular blank zone surrounding said wide-angle zone and located between said plane mirror zone and said wide-angle mirror zone and integral therewith, said blank zone defining a surface separating said wide-angle and plane zones, so that said exterior rearview mirror provides a wider image without a blind spot or any interference between zones.

2. The automobile exterior rearview mirror as recited in claim 1 wherein said wide-angle mirror zone is disposed at the lower center of said plane mirror zone.

3. The automobile exterior rearview mirror as recited in claim 1 wherein said plane mirror zone is rectangular and wherein said wide angle mirror zone is disposed at a lower corner of said plane mirror zone.

* * * * *